United States Patent
Busato et al.

(10) Patent No.: US 7,104,523 B2
(45) Date of Patent: Sep. 12, 2006

(54) VALVE HAVING CONTAMINATION COUNTER-MEASURES

(75) Inventors: Murray Busato, Clinton Township, MI (US); Joseph A. Wilson, Royal Oak, MI (US); James T. McIntyre, Sterling Heights, MI (US); Peter G. Weissinger, Sterling Heights, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/144,578

(22) Filed: Jun. 3, 2005

(65) Prior Publication Data

US 2005/0274920 A1  Dec. 15, 2005

Related U.S. Application Data

(60) Provisional application No. 60/578,941, filed on Jun. 12, 2004.

(51) Int. Cl.
*F16K 31/02* (2006.01)
(52) U.S. Cl. ............. 251/214; 123/568.21; 137/242; 251/355
(58) Field of Classification Search ............. 251/214, 251/129.15, 355; 123/568.11, 568.21, 568.23, 123/568.26; 137/242
See application file for complete search history.

(56) References Cited

U.S. PATENT DOCUMENTS

| 4,408,627 | A  | * | 10/1983 | Harris | ............... 137/242 |
| 4,725,040 | A  | * | 2/1988  | Fornuto et al. | ........ 251/129.15 |
| 5,511,531 | A  | * | 4/1996  | Cook et al. | ............. 123/568.21 |
| 5,666,932 | A  | * | 9/1997  | Bauerle et al. | ........ 123/568.21 |
| 6,453,934 | B1 |   | 9/2002  | Bircann et al. | |
| 6,481,424 | B1 |   | 11/2002 | Bircann et al. | |
| 6,644,622 | B1 | * | 11/2003 | Modien | ................. 251/129.15 |
| 6,655,657 | B1 | * | 12/2003 | Bircann | ...................... 251/214 |
| 6,874,754 | B1 | * | 4/2005  | Geib et al. | .................. 251/214 |
| 6,874,755 | B1 | * | 4/2005  | Bircann | ...................... 251/214 |
| 2004/0041115 | A1 | | 3/2004 | Geib et al. | |
| 2004/0051067 | A1 | | 3/2004 | Fujita et al. | |
| 2004/0065860 | A1 | | 4/2004 | Bircann | |

* cited by examiner

*Primary Examiner*—John Bastianelli
(74) *Attorney, Agent, or Firm*—Warn, Hoffmann, Miller & LaLone, P.C.; Greg Dziegielewski

(57) ABSTRACT

An anti-coking valve arrangement having a valve body that defines a passage for the flow of fluid medium. Valve seat and valve member positioned within the valve body and function to control the flow of fluid medium. A first anti-coking device is operably associated with the valve stem. A second anti-coking device is operably associated with the bearing guide member. A third anti-coking device is operably associated with the valve member and the valve seat. A fourth anti-coking device is operably associated with the valve stem and the bearing guide. A fifth anti-coking device is operably associated with the bearing guide. A sixth anti-coking device is operably associated between the valve stem and the bearing guide.

29 Claims, 4 Drawing Sheets

VALVE HAVING CONTAMINATION COUNTER-MEASURES

CROSS-REFERENCE TO RELATED APPLICATIONS

This application claims the benefit of U.S. Provisional Application No. 60/578,941, filed Jun. 12, 2004. The disclosure of which is incorporated herein by reference.

FIELD OF THE INVENTION

The present invention relates to an exhaust gas recirculation (EGR) valve having countermeasures for eliminating the effects of valve contamination.

BACKGROUND OF THE INVENTION

Federal and State legislation require control of vehicle exhaust emissions. Oxides of Nitrogen (NOx) are one of the exhaust gas emissions that must be controlled.

Formation of NOx will occur at higher combustion temperatures. In order to reduce the occurrence of the formation of NOx gasses, exhaust gas recirculation systems have been developed which effectively reduce combustion temperatures and control emissions. Exhaust gas recirculation systems work by re-circulating a portion of the exhaust gas from an engine back to the intake manifold where it can combined with incoming air. When the mixture is compressed and ignited in the cylinder the result is a lower combustion temperature and the reduction of NOx. In order to make the recirculation of exhaust gas possible exhaust gas recirculation systems use exhaust gas recirculation (EGR) valves to open and close the conduits that recirculate the exhaust gas back to the intake manifold of the engine.

The composition of exhaust gas includes substances that can effect the operation of the EGR valve. These substances typically adhere to the EGR valve components and restrict movement of the poppet valve, valve stem and other associated valve components. Additionally, it is particularly important to avoid exposing the actuator component of an EGR valve to the exhaust gas. In general contamination of an EGR valve impedes the movement of the valve and may require higher actuating force to achieve a desired valve position and exhaust gas flow. Counter measures can be implemented in an EGR valve to limit the effects of contamination. The following description and figures describe a number of counter measures for contamination. It should be noted that these counter measures can be selected for use individually or collectively depending on a specific application.

SUMMARY OF THE INVENTION

The present invention is directed to an anti-coking valve arrangement having a valve body defining an internal passage for the passage of fluid medium through the valve body. A valve seat is positioned within the internal passage within the flow path of the fluid medium. A valve member is positioned within the internal passage and is operably associated with the valve seat. The valve member controls the flow of fluid medium through the valve seat. A valve stem is connected to the valve member and helps facilitate the movement of the valve member with respect to the valve seat. A bearing guide member supports the valve stem during movement within the internal passage. A first anti-coking device is operably associated with the valve stem. A second anti-coking device is operably associated with the bearing guide member. A third anti-coking device is operably associated with the valve member and the valve seat. A fourth anti-coking device is operably associated with the valve stem and the bearing guide. A fifth anti-coking device is operably associated with the bearing guide. A sixth anti-coking device is operably associated between the valve stem and the bearing guide. It should be noted that the use of the anti-coking devices, also called counter measures can be selected for use individually or collectively depending on a specific application.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
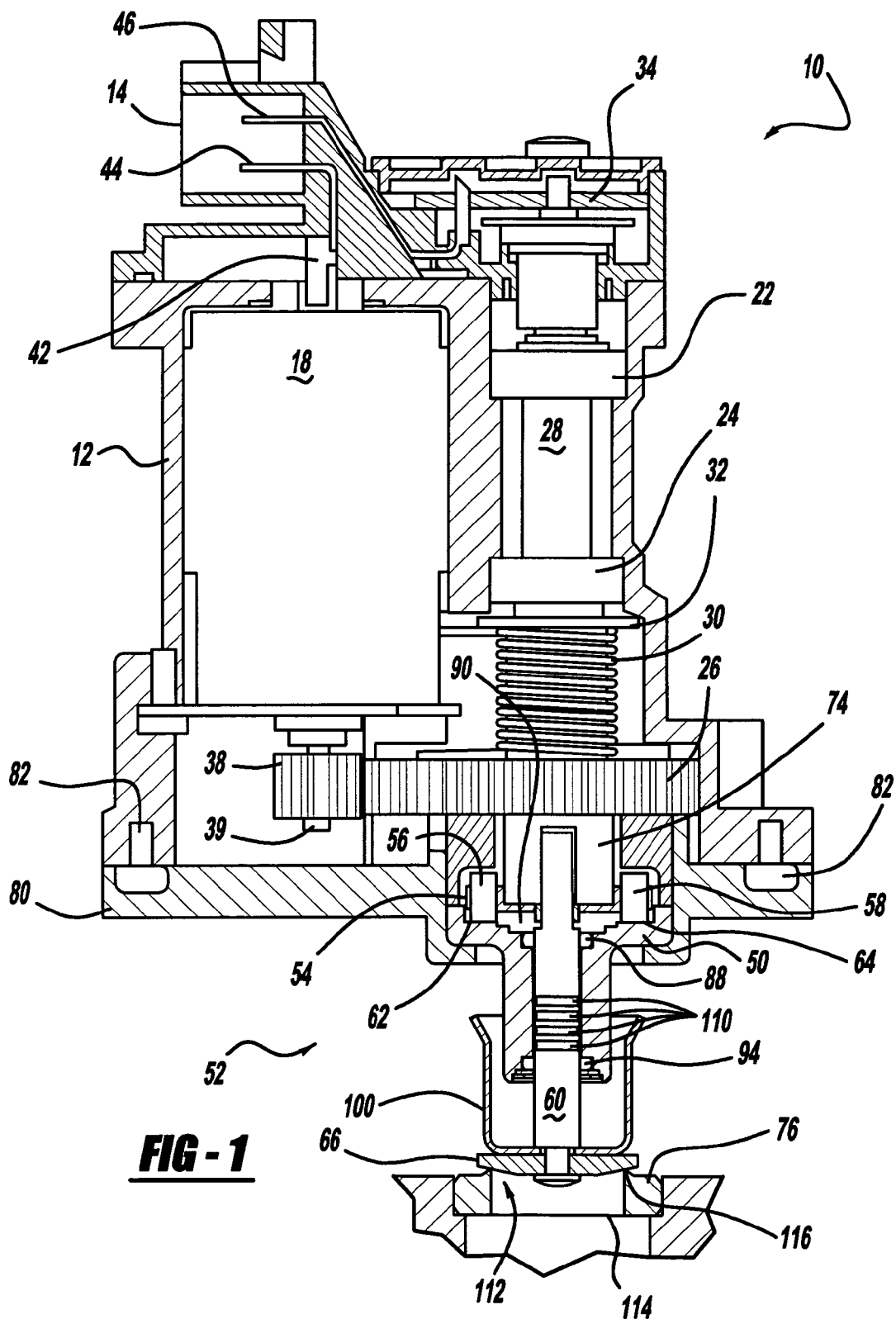
FIG. 1 is a cross-sectional plan view of an EGR valve design according to the present invention.

The construction of the valve assembly 10 according to the present invention is shown in cross-section in FIGS. 1 through 4. Note, the same identification number will be used to identify similar components, subassemblies, and assemblies in the figures shown herein. Valve assembly 10, which also may be referred to as an anti-coking valve arrangement, has an actuator housing 12 that contains a motor 18 for actuating the valve assembly 10. An electrical connector 14 disposed through the actuator housing 12 is integrated with a position sensor 34. Terminals 42 of the motor 18 interconnect with terminals 44 of the electrical connector 14 to provide an external connection to a suitable engine electronic control unit (ECU).

The motor 18 has a motor stem 39 with a gear 38 connected. The gear 38 engages a second gear 26 and both gears 26, 38 rotate when the motor 18 is actuated. The gear 38 is rotatably connected to a shaft 28 that is disposed through a bushing 22 and roller bearing 24 that are fixed to the actuator housing 12. A torsion spring 30 and spring bushing 32 are placed over the shaft 28 and apply a return force on the gear 26 when it is moved in a direction that winds the spring 30. The position sensor 34 detects the position of the gear 38 by monitoring the rotation of the shaft 28. As discussed below the rotation of the shaft 28 is indicative of the position of the components of a valve subassembly 52.

Figure 2:
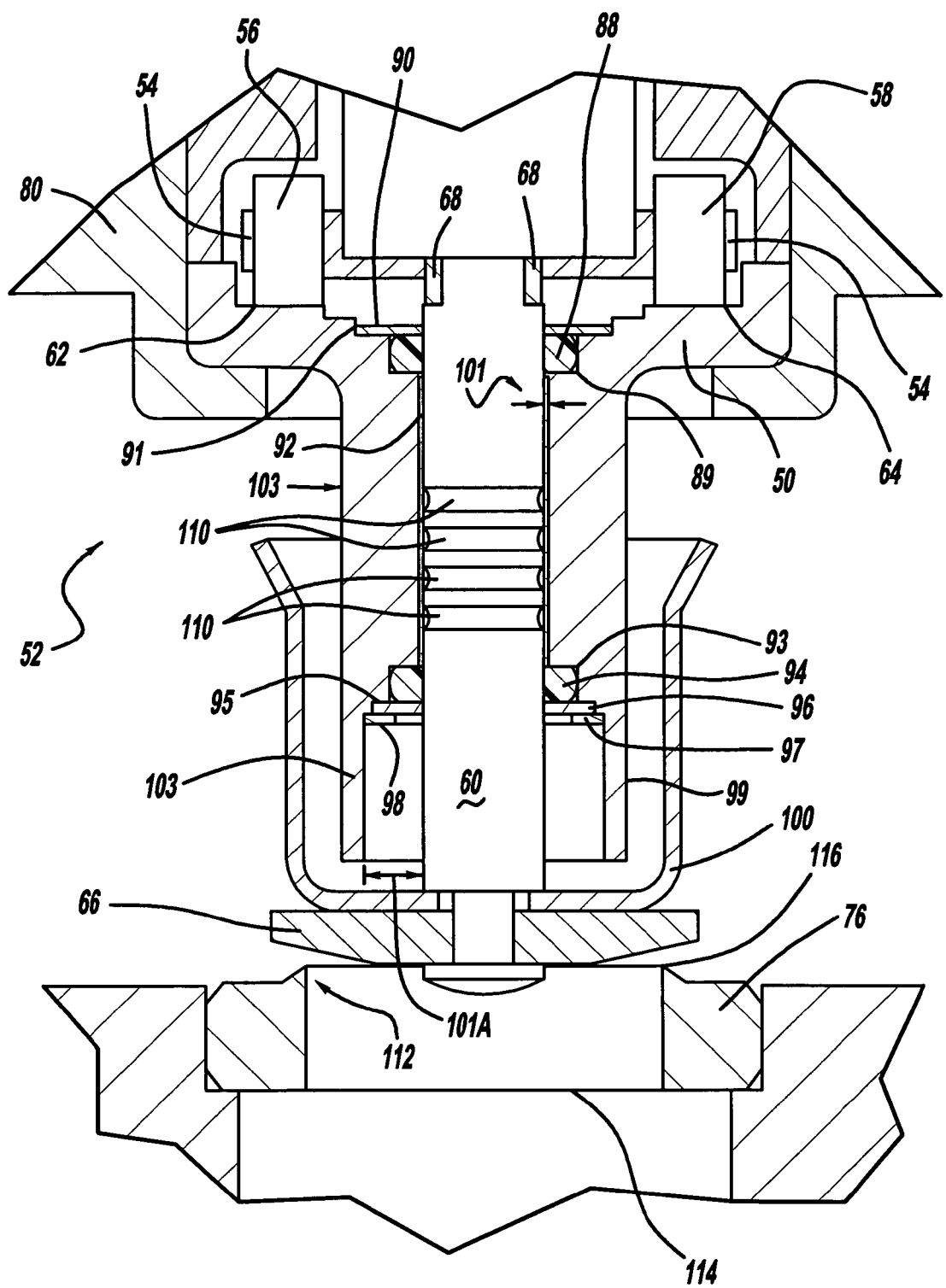
FIG. 2 is a cross-sectional plan view of an EGR valve in an open position according to the present invention.
Figure 3:
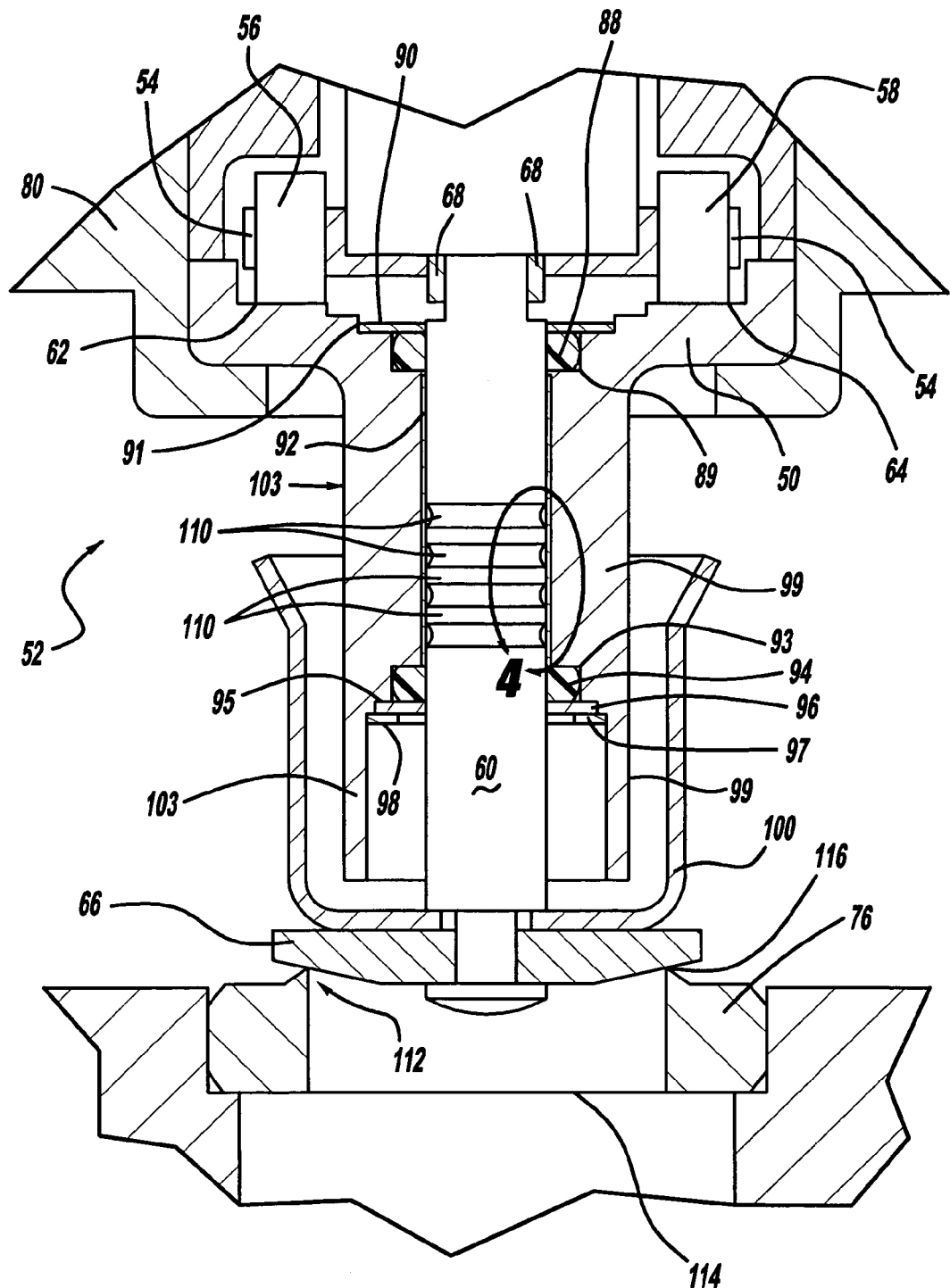
FIG. 3 is a cross-sectional plan view of an EGR valve in a closed position according to the present invention.

The valve subassembly 52 has a retainer housing 80, bearing guide 50, valve stem 60, pin 54, bearings 56 and 58, and poppet valve 66. The valve assembly 10 and valve subassembly 52 are aligned by suitable locating features and are held together by fasteners 82. The poppet valve 66 is positioned in relation to a valve seat 76 that is placed in the path of fluid flow though the valve assembly 10. The poppet valve 66 is connected to a first end of the valve stem 60 by suitable means such as swaging. The valve stem 60 extends away from the poppet valve 66 though the bearing guide 50 which is secured in the retainer housing 80 by suitable means such as swaging as shown in FIGS. 2 and 3. The pin 54 is disposed through a second end of the valve stem 60 at a generally perpendicular angle. Bearings 56 and 58 are each fastened at an end of pin 54 and slidably engaged to a pair of slotted guide ramps 62 and 64 formed in the bearing guide 50.

When the ECU provides a suitable control signal to the motor 18, it will cause gears 38 and 26 to rotate. The gear 38 is connected to the pin 54 by an integral fork 74 formed in the gear 38. The integral fork 74 applies torque to the pin 54 and causes the bearings 56 and 58 to slide along the pair of slotted guide ramps 62 and 64 which in turn forces the valve stem 60 to rotate and move in an axial direction. The slotted guide ramps 62 and 64 have a defined slope that will cause the desired axial movement of the valve stem 60. The slotted guide ramps 62 and 64 are either machined into a one-piece bearing guide 50, as shown in FIGS. 1, 2 and 3, or they may be made in more than one-piece to accommodate various assembly methods. The control signal from the ECU can cause the motor 18 and gears 38 and 26 to rotate in either a clockwise or counter-clockwise direction therefore the valve stem 60 and poppet valve 66 can move either direction.

Figure 4:
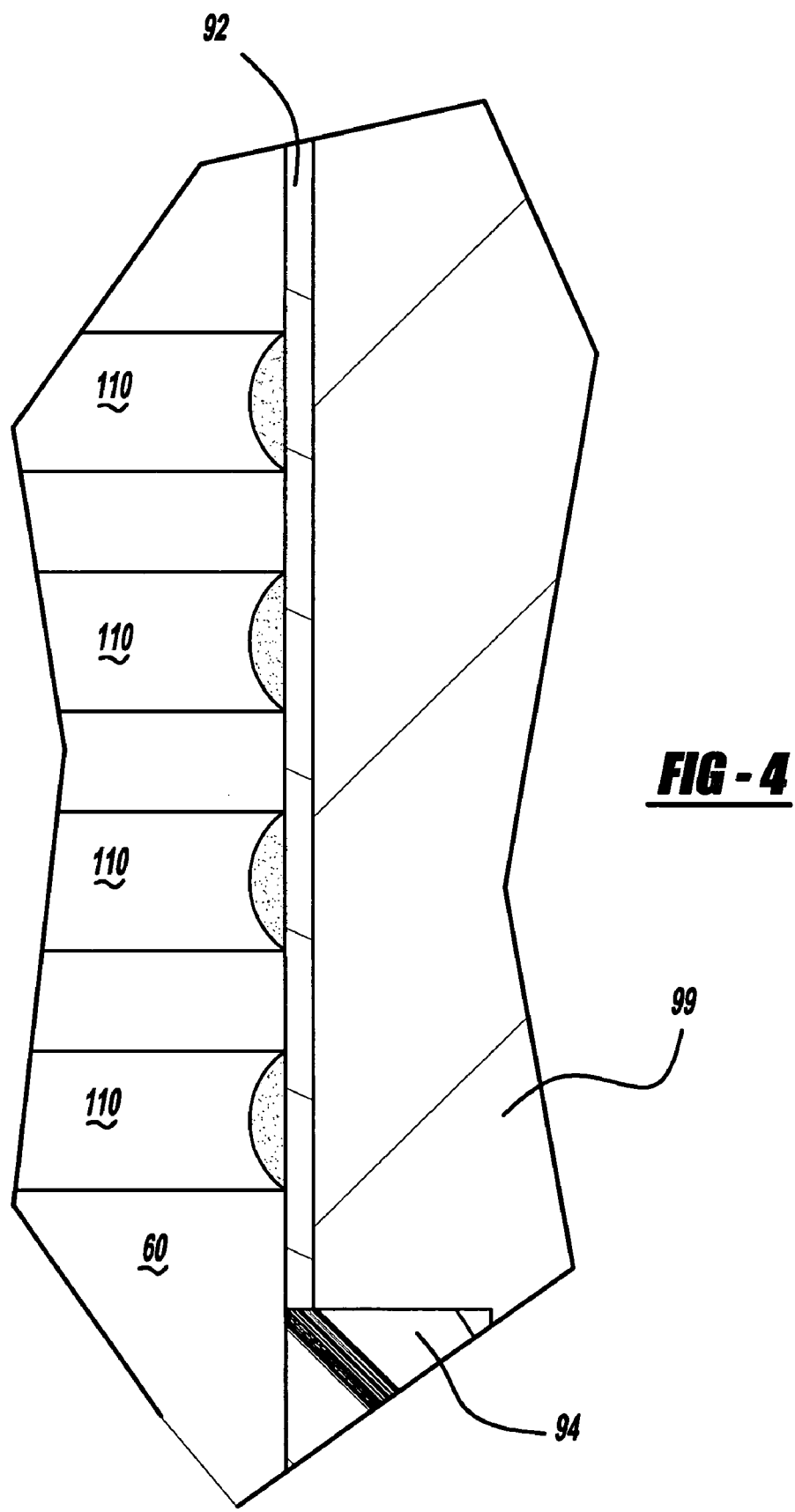
FIG. 4 is an enlarged cross-sectional view of a valve stem and bearing guide according to the present invention.

Referring to FIGS. 2, through 4, a first anti-coking device is comprised of a flow deflector 100 installed on the valve stem 60. The flow deflector 100 and poppet valve 66 are retained on valve stem 60 by suitable means such as swaging. The flow deflector 100 diverts the flow of exhaust gas thought the valve seat 76 away from the valve stem 60. Diverting flow with the flow deflector 100 reduces the amount of contamination that will adhere to the valve stem 66 or enter the valve assembly 10 and cause binding or sticking. Flow deflector 100 is formed as a cup-shaped part that is coaxial with the valve stem 60. The wall of the flow deflector 100 shields the valve stem 60 and bearing guide 50 and creates a tortuous path for contamination to enter the integral bearing section of the bearing guide 50. When poppet valve 66 is unseated from valve seat 76, flow deflector 100 will divert the exhaust gas away from the valve stem 60 and components of valve subassembly 52.

The flow deflector 100 can have various constructions to suit different manufacturing methods. The flow deflector 100 and the poppet valve 66 could be made into a single component, by means such as a stamping. It could also be made of a sleeve pressed or fastened to the poppet valve 66. The flow deflector 100 and poppet valve 66 can also be two pieces press-fit together or they may be joined by other means such as welding, brazing, or by a mechanical interlock and crimp.

A second anti-coking device diverts the exhaust gas flow away from the valve stem 60 using a stem shield 99. The bearing guide 50 has been extended towards the poppet valve 66 defining a bearing guide extension 103. An annular clearance 101A between outside diameter of the valve stem 60 and inside diameter of the bearing guide 50 will provide a suitable clearance over the bearing guide extension 103 defining the stem shield 99. The stem shield 99 decreases the unprotected area of the valve stem 60 that is exposed to the exhaust gases passing through the valve seat 76. This in turn reduces the ability for contaminants to be introduced to the valve subassembly 53 and actuator valve assembly 10.

An alternate method to create the stem shield 99 is to form a separate stem shield 99 using suitable material such as stainless steel. The stem shield 99 will be trapped between bearing guide 50 and the retainer body 80, providing a similar function to the stem shield 99 integrated into the bearing guide 50.

A third anti-coking device is a reduced contact seating area between the valve seat 76 and poppet valve 66, which is provided by using and taper, or extension 112 that extends radially outward from its central axis. The effective area for pressure acting on the poppet valve 66 is minimized by having a constant flow path diameter 114 as it approaches the valve seat 76 and poppet valve 66 seating area.

This anti-coking device will oppose the effects of contamination in the following manner. The force required to unseat a contaminated poppet valve 66 is relative to the contact area between the poppet valve 66 and valve seat 76, and the resultant force caused by the pressure differential imposed on the poppet valve 66 area defined by the seal. The contact area between poppet valve 66 and valve seat 76 has been minimized by adding an extension 112. The extension 112 runs radially outward, from the central axis of the valve seat 76, as the distance, from the contact point of the poppet valve 66 and valve seat 76, increases. The area that will collect contamination has been reduced and the force required to unseat the valve poppet 66 has been minimized. The resultant force caused by the pressure differential imposed on the poppet valve 66 area can be minimized by maintaining a constant diameter 114, or decreasing flow path diameter, as it approaches the poppet valve 66 and valve seat 76 contact area. The intersection of extension 112 and diameter 114 may require a small radius 116, such as 0.03 mm, to remove burrs resulting from the manufacturing process.

A fourth anti-coking device involves adding a lubricant 92 to the valve subassembly 52 which will prevent contamination from adhering to the components, and create a seal to prevent contamination from passing through to the valve subassembly 52. The lubricant 92 is located on the surface of the valve stem 60 and within the integral bearing section of bearing guide 50. The lubricant 92 is selected for properties such as operating temperature and its ability to maintain its position in valve subassembly 52. The seal will be maintained even during periods with high-pressure differentials because of a small annular clearance 101 between the valve stem 60 and the integral bearing section of bearing guide 50. The resulting force acting on the lubricant 92 is not sufficient to displace it from the valve subassembly 52. Grooves 110 in valve stem 60 act as collection areas for the lubricant 92 and help maintain it in the valve subassembly 52. The lubricant 92 may be high temperature grease.

A fifth anti-coking device is comprised of adding one or more valve stems seals to valve subassembly 52. An upper valve stem seal 88 fits into a first counter bore 89 in bearing guide 50. It is held in position by a retainer washer 90 that fits into a second counter bore 91, above upper stem seal 88 in the bearing guide 50. A lower valve stem seal 94 fits into a third counter bore 93 in bearing guide 50. The lower valve stem seal 94 is held in position by a retainer washer 98 that fits into a fifth counter bore 97, below the stem seal 94. Upper valve stem seal 88 and lower valve stem seal 94 block flow into-and-out-of the integral bearing section of bearing guide 50 and the actuator components (e.g. motor 18, gears 26, 38, etc). The upper valve stem seal 88 and lower valve stem seal 94 are made of suitable materials such as fluorocarbon or Teflon. The upper valve stem seal 88 and lower valve stem seal 94 may also be molded or fastened to another component for ease of handling. The other component may be a metal washer like part that maintains the shape of the seal. It can also provide the mechanical properties require to press fit the seal to the valve subassembly.

A sixth anti-coking device is comprised of a valve stem scraper 96 which will reduce the potential for sticking and binding by preventing the contamination from accumulating on the valve stem 60 and in the integral bearing section of bearing guide 50. The valve stem scraper 96 fits into a fourth counter bore 95, in the bearing guide 50, below the lower valve stem seal 94. The valve stem scraper 96 is held in position by a retainer washer 98 that fits into a fifth counter bore 97. The valve stem scraper 96 has a similar geometry to a common washer. The clearance between the inside diameter of valve stem scraper 96 and the outside diameter of the valve stem 60 is smaller than the clearance between the inside diameter of the integral bearing section of bearing guide 50 and the valve stem 60. For example, the radial clearance between the inside diameter of valve stem scraper 96 and the outside diameter of the valve stem 60 can be 0.02 mm, and the radial clearance between the inside diameter of the integral bearing section of bearing guide 50 and outside diameter of the valve stem 60 could be 0.04 mm. The valve stem scraper 96 will remove contamination from the valve stem 60 as the valve stem 60 moves through its stroke. Any contamination remaining on the valve stem 60 can enter the integral bearing section of bearing guide 50 with sufficient clearance to prevent binding. The depth of the fourth counter bore 96 for the valve stem scraper 96 is dimensioned to allow it move freely about the central axis of the valve stem 60 to allow for any misalignment.

Some applications may be less harsh and may not require all contamination countermeasures. It should be noted that one or a combination of the countermeasures described can be selected to be sufficient to prevent the effects of contamination.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An anti-coking valve arrangement comprising:
   a valve body defining an internal passage for the passage of fluid medium through the valve;
   a valve seat located in said valve body further defining said internal passage for said fluid medium;
   a valve member operably associated with said valve seat;
   a valve stem connected to said valve member for facilitating the movement of said valve member;
   a bearing guide member supporting said valve stem;
   a first anti-coking device operably associated with said valve stem;
   a second anti-coking device operably associated with said bearing guide member;
   a third anti-coking device operably associated with said valve member and said valve seat;
   a fourth anti-coking device operably associated with said valve stem and said bearing guide;
   a fifth anti-coking device operably associated with said bearing guide; and
   a sixth anti-coking device operably associated between said valve stem and said bearing guide.

2. The anti-coking valve arrangement of claim 1, wherein, said first anti-coking device is a flow deflector which deflects contaminants in said fluid away from said valve stem and creates a tortuous path for said contaminants in said fluid, preventing said contaminants from building up on said stem and inhibiting the movement of said valve stem.

3. The flow deflector of claim 2, wherein said flow deflector can be comprised of a one-piece flow deflector, a two-piece flow deflector joined by welding, a two-piece flow deflector joined by press fit, brazing, crimping, or any combination thereof.

4. The second anti-coking device of claim 1, wherein said second anti-coking device is a stem shield being extended along said valve stem to prevent contamination build-up on said valve stem.

5. The stem shield of claim 4, wherein said stem shield is comprised of a separate member preventing contamination build-up on said valve stem.

6. The anti-coking valve arrangement of claim 1, wherein said third anti-coking device is an extension on said valve seat that provides a reduced contact seating area between said extension and said valve seat while maintaining the minimum flow area through said valve seat.

7. The anti-coking valve arrangement of claim 1, wherein said fourth anti-coking device is a lubricant on the surface of said valve stem at a portion of said valve stem disposed through said bearing member.

8. The anti-coking valve arrangement of claim 1, wherein said fifth anti-coking device is a first seal located on said valve stem at the opposite end of said valve member, and a second seal located in an intermediary position along said valve stem, wherein said first seal and said second seal prevent contaminants from building up on said valve stem.

9. The anti-coking device of claim 8, wherein said first seal is an upper stem seal located on one side of said bearing guide member and a lower stem seal located on a second side of said bearing guide member.

10. The fifth anti-coking device of claim 1, wherein said first seal and said second seal prevent contaminants from building up on said valve stem.

11. The anti-coking valve arrangement of claim 1, wherein said sixth anti-coking device is a scraper comprised of a device which circumscribes said valve stem creating a small clearance between said scraper and said valve stem.

12. The sixth anti-coking device of claim 11, wherein said small clearance allows said scraper to remove contaminants from said valve stem.

13. The sixth anti-coking device of claim 11, wherein said small clearance is less than the clearance between said bearing guide and said valve stem.

14. A valve arrangement having anti-contamination devices, comprising:
   a valve body formed such that a passage is created for fluid to flow through;
   a movable poppet valve mounted on a stem, movable inside said valve body;
   a valve seat having an extension that provides a reduced contact seating area between said poppet valve and said valve seat while maintaining the minimum flow area through said valve seat;
   a flow deflector connected to and circumscribing said valve stem;
   a bearing guide located in said valve body;
   a stem shield operably associated with said bearing guide;
   a seal located in said bearing guide, circumscribing said valve stem on a first end; and
   a scraper located in said bearing guide.

15. The valve arrangement of claim 14 further comprising a second seal, located in said bearing guide.

16. The valve arrangement of claim 14 further comprising lubricant located in said bearing guide.

17. The valve arrangement of claim 14, wherein said flow deflector is configured to deflect fluid flowing past said valve member away from said valve stem.

18. The valve arrangement of claim 14, wherein said stem shield is comprised of an extended form of said bearing guide.

19. The stem shield of claim 18, wherein said bearing guide extends toward said movable poppet valve, preventing said contaminants from building up on said valve stem.

20. The valve arrangement of claim 14, wherein said scraper features an inner diameter in close relationship to the outer diameter of said valve stem, forming a small clearance between said scraper and said valve stem.

21. The scraper of claim 20, wherein said small clearance forces said scraper to remove contaminants from said valve stem.

22. The scraper of claim 20 wherein the scraper is moveable about said valve stem in a counter bore of said bearing guide.

23. The valve arrangement of claim 14, wherein said stem includes grooves which act as collection areas for the lubricant and control said lubricant within said bearing guide.

24. The valve arrangement of claim 14, wherein said lubricant provides a pressure seal resulting from the pressure differential across the lubricant, wherein the amount of pressure is limited to an acceptable level from the clearance between said stem and said bearing guide, limiting the effects of said contaminants.

25. The valve arrangement of claim 14, wherein said extension on said valve seat provides a constant flow area moving in the direction of the contact area between said valve seat and said poppet valve.

26. A valve assembly equipped for preventing contamination, comprising:
   a valve body assembly through which a fluid is transported;
   a poppet valve mounted on a valve stem, located in said valve body assembly and is able to move therein such that when said poppet valve is opened, fluid is allowed to pass through said valve body;
   a bearing guide for guiding said valve stem in a specific direction when said poppet valve is to be opened or closed;
   a valve seat operably associated with said poppet valve;
   a flow deflector located on said valve stem, positioned next to said poppet valve such that said valve stem is protected from contamination in said fluid by said flow deflector deflecting contaminants located in said fluid and preventing said contaminants from accumulating on said valve stem;
   a stem shield which circumscribes said valve stem, operably associated with said bearing guide, formed by extending said bearing guide toward said poppet valve, creating said stem shield, which deflects contaminants away from said valve stem, preventing contamination build-up in said valve assembly;
   a tapered surface located on said valve seat working in conjunction with said poppet valve forming a minimized contact area;
   a first seal circumscribed on said valve stem, which works to block said contaminants from entering said bearing guide;
   a scraper comprised of a device which circumscribes said valve stem creating a small clearance between said scraper and said valve stem, said small clearance allowing said scraper to remove contaminants from said valve stem;
   a second seal circumscribed on said valve stem, which works to block said contaminants from entering said bearing guide; and
   a lubricant located in said bearing guide which creates a seal, preventing said contaminants from passing through said valve assembly.

27. The valve assembly of claim 26, wherein an annular clearance is formed between the outside diameter of said valve stem and the inside diameter of said extended bearing guide, providing a suitable clearance over the extended bearing guide.

28. The valve assembly of claim 26, wherein said stem shield is a separate device.

29. The valve assembly of claim 26, wherein said lubricant is in contact with said valve stem and said bearing guide.

* * * * *